United States Patent [19]

Andrews

[11] 4,081,220
[45] Mar. 28, 1978

[54] SEMI-SPAR WOUND BLADE
[75] Inventor: Merritt B. Andrews, Westfield, Mass.
[73] Assignee: United Technologies Corporation, Hartford, Conn.
[21] Appl. No.: 751,578
[22] Filed: Dec. 17, 1976
[51] Int. Cl.² .............................................. F03D 1/06
[52] U.S. Cl. ..................................... 416/226; 416/230; 416/241 A
[58] Field of Search ............... 416/226, 241 A, 132 B, 416/230, 230 A; 156/156; 428/158
[56] References Cited
U.S. PATENT DOCUMENTS

| 3,000,446 | 9/1961 | Warnken | 416/230 A |
|---|---|---|---|
| 3,028,292 | 4/1962 | Hinds | 156/214 |
| 3,038,543 | 6/1962 | Davidson | 416/132 |
| 3,237,697 | 3/1966 | Ford et al. | 416/226 |
| 3,713,753 | 1/1973 | Brunsett | 416/226 |
| 3,902,944 | 9/1975 | Ashton et al. | 156/156 |
| 3,943,020 | 3/1976 | Ashton et al. | 156/156 |
| 3,962,506 | 6/1976 | Dunahoo | 428/158 |
| 3,967,996 | 7/1976 | Kamov et al. | 156/156 |

Primary Examiner—Everette A. Powell, Jr.
Attorney, Agent, or Firm—Charles A. Warren

[57] ABSTRACT

A wind turbine blade in the form of a semi-spar in which the outer portion of the finished blade shape is the filament wound spar itself and the remainder of the blade incorporates a trailing edge portion, increasing in dimension toward the blade base, this part of the blade being filament wound around the spar.

10 Claims, 12 Drawing Figures

SEMI-SPAR WOUND BLADE

BACKGROUND OF THE INVENTION

In the development of high performance windmills the blades are desirably very long and must be made of low cost, low weight material with adequate stiffness and strength. It is also necessary that the blades have an efficient airfoil shape for best performance. Filament winding can produce the desired shapes at low cost but these shapes require fiber orientation and wall thickness varientations that are necessary to achieve stiffness and strength criterion.

SUMMARY OF THE INVENTION

One feature of the invention is a semi-spar blade in which a spar is filament wound on a generally uniformly shaped or slightly tapered mandrel with the fibers so oriented as to produce the desired torsional and bending stiffness and stength. When the mandrel is removed from the spar, a trailing edge portion is subsequently filament wound around the spar and on a parallel trailing edge mandrel. The wraps forming the trailing edge portion will have fiber orientation for compatible stiffness characteristic of this portion of the blade. Another feature is the formation of the trailing edge portion on the main portion of the blade but shaping the outer end of the spar itself to the finished blade shape. In producing the desired airfoil shapes for the blade, the spar may be contoured, either by a shaped mandrel or after removal of its mandrel to provide, with the trailing edge mandrel, the desired airfoil sections throughout the trailing edge portion of the blade. Another feature is the use of a varying thickness filament to produce a thicker wall near the base than at the tip.

According to this invention the spar is wound on a mandrel to produce a hollow spar after the mandrel is withdrawn. The outer portion of the spar may be solid and, of itself, form the finished blade shape. Over the remainder of the spar, a trailing edge mandrel is attached to the spar, which may have been flattened to produce the desired airfoil leading edge portion, and the combined spar and trailing edge mandrel are then filament wound to complete the blade shape. The trailing edge mandrel is tapered to produce the desired airfoil blade shape. This mandrel may be removed after the winding is completed or a non-removable mandrel, for example foam, may be used for all or for portions of the blade windings.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENT

Figure 1:
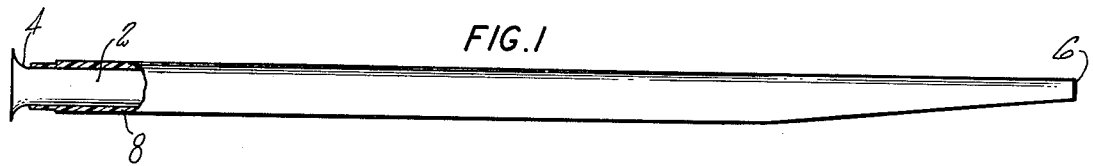
FIG. 1 is a view of the filament wound spar.
Figure 2:
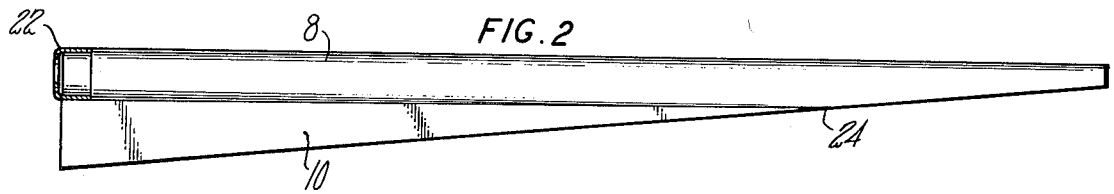
FIG. 2 is a view of the spar with the trailing edge mandrel attached.
Figure 3:
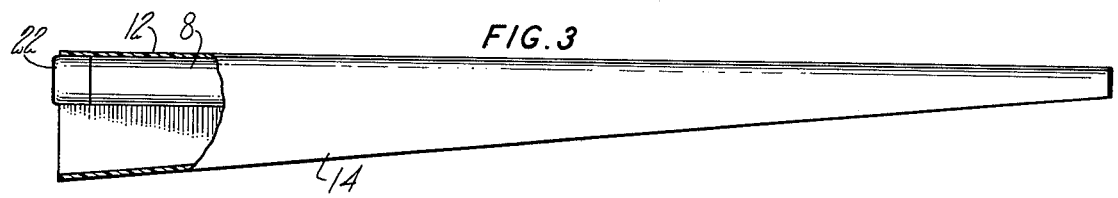
FIG. 3 is a view after the windings are finished.
Figure 4:
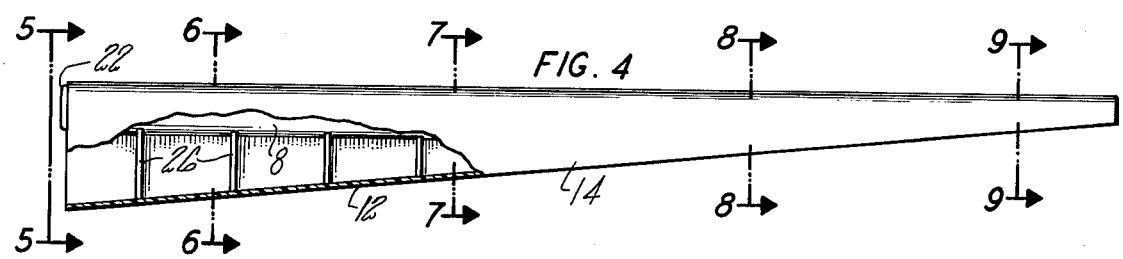
FIG. 4 is a view of the completed blade.
Figure 5:
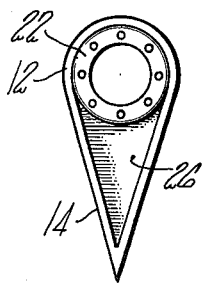
FIG. 5 is a sectional view along 4—4 of FIG. 4.
Figure 6:
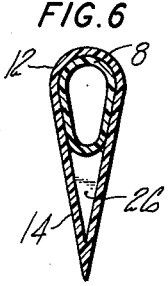
FIG. 6 is a sectional view along 5—5 of FIG. 4.
Figure 7:
FIG. 7 is a sectional view along 6—6 of FIG. 4.
Figure 8:
FIG. 8 is a sectional view along 7—7 of FIG. 4.
Figure 9:
FIG. 9 is a sectional view along 8—8 of FIG. 4.

These blades are extremely long, some of them being as much as 100 feet long to produce a rotor of about 200 feet in diameter. Thus, the accompanying drawing gives no adequate concept of the size of the blade involved. The blades are subjected to severe bending and twisting at design loadings. The filament lay and the wall thickness build-up must be such as to produce adequate torsional and bending stiffness within the airfoil section limitations. Excessively thick airfoil sections will penalize performance while overly thin sections will require greater wall thicknesses, thus increasing blade weights and costs.

A mandrel 2 for the spar is formed with such a cross-sectional shape that, when filament wound, it can be withdrawn from the surrounding completed spar. The mandrel may either be circular in cross section or may be flattened toward the outer end in order to produce the desired finished blade shape. In either event this mandrel is filament wound from its base 4 to its tip 6, with any of many filament materials. One filament is a fiberglass filament and these filaments are resin coated to form a solid mass of material surrounding the mandrel. The wound filaments may be "prepreg" or pre-coated and generally formed into ribbons of several filaments held together by the coating resin, with these ribbons wound on the mandrel. These filaments are wound on the mandrel to form the spar 8. In winding the spar the successive layers of filaments are placed at such an angle to the blade axis and to one another as to produce a maximum of bending and torsional strength. For example, successive layers at right angles to each other and at 45° to the spar axis are in many cases the best arrangement.

Alternatively, the filaments may be coated as they are being wound on the mandrel. In either event, the filaments are wound on the mandrel in a helical form until the mandrel is completely covered with the desired number of layers of filament of the necessary strength. This spar is shown as having a uniform wall thickness although the thickness may taper from base to tip either by more layers of filaments near the base or by inserting layers or cloth or other fillers or by the use of tapered filaments such that each filament or at least many of the filaments that are wound at the base of the blade are thicker than those wound at the tip.

As shown, after the spar 8 is finished, a trailing edge mandrel 10 is attached thereto to form with the spar a composite mandrel, and this composite is then helically filament wound to produce the finished blade. The trailing edge mandrel is shorter than the spar as shown and tapers from base to tip so as to form an increasingly wider blade toward the base.

The filament winding 12 on the composite mandrel to form the trailing edge portion 14 may be applied to the desired thickness which may be uniform throughout but is preferably increasingly thinner as shown from base to tip dependent upon the bending and torsional resistance necessary in the finished blade. This decreasing thickness is produced, as described above in connection with the spar, either by gradually decreasing the number of layers of windings toward the tip or by applying filaments that individually decrease in thickness from the base toward the tip of the blade or by filler material or by all of these techniques combined.

Figure 10:
FIG. 10 is a section through one form of filament.
Figure 11:
FIG. 11 is a section through a larger diameter filament.
Figure 12:
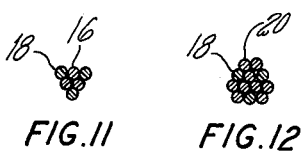
FIG. 12 is a section through an even larger diameter filament.

Varying filament thickness may be produced, for example, as shown in FIGS. 10-12, by combining three fibers or strands 16 together for the smallest diameter, by surrounding these three fibers with three other fibers or strands 18 for a medium diameter filament, and by adding six more fibers 20 for the largest diameter of filament. The necessary length of the portion of each diameter of the finished filament for successive windings is readily determined by computer, and the varying diameter filament may then be wound on the mandrel with the desired thicknesses at the appropriate locations along the mandrel length. These variable filament thickness windings may be produced by a mechanism carrying a plurality of spools adjacent to the filament winding machine and so controlled as to pick up the necessary number of strands to produce the required diameter for the portions of the blade being wound. Alternatively, these variable diameter filaments may be preformed and delivered for winding in the predetermined diameters. In either event, the necessary length of each diameter in the full filament winding is readily determined by knowing the dimension of the mandrel and the angle of the winding.

In the winding of the composite mandrel the successive layers are arranged at such angles to one another as to produce the desired stress and stiffness. Because of the spar structure, it may be desirable to have these filaments at different angles than in the spar depending upon stiffness requirements. The last winding is preferably at right angles to the blade axis to provide the best airflow surface on the blade.

The filament winding having been completed, the blade structure is conventionally heated to solidify the resin. Other steps, such as wrapping the finished blade with a 90° winding to pressurize the helical filament windings and the resin thereon for a curing operation are well known and need not be described as they are not a part of the present invention.

The finished product, the blade, has a circular base 22 formed by the spar by which to attach the blade to the rotor hub. For example, metallic inserts or rings may be wound into the base end of the blade to afford hard points for attachment. Adjacent the base 22, the trailing edge portion begins and from this point, FIGS. 5-9 inclusive, the spar becomes progressively thinner to form, with the associated trailing edge portion, efficient airfoil sections that become continuously thinner toward the outer end of the trailing edge portion of the blade. Thus the airfoil shapes are best adapted to the blade speed at the respective diameters of the finished rotor.

The outboard portion of the blade beyond the tip 24 of the trailing edge portion of the blade is the spar itself. From here to the blade tip the spar also becomes thinner and narrower and the outer surface of the spar is the finished surface of this portion of the blade. The spar may become solid rather than hollow toward the blade tip if convenient or desired, or a lightweight filler may be added to completely or partially fill the void. This can be accomplished by either inserting a filler piece, by foaming the filler in place, or by winding the spar on a permanent foam mandrel. Obviously, the layers of filaments applied to the composite mandrel near the tip of the trailing edge mandrel become fewer and fewer to assure a smooth outer surface on the blade at this part of the finished blade.

The finished blade, with the trailing edge mandrel removed, has several supporting baffles 26 positioned in the trailing edge portions of the blade for stiffening the blade. These may be set in one after the other since the recess tapers from end to end. The finished blade obviously includes the spar, and the trailing edge section, the spar having formed a part of the composite mandrel during the winding of the trailing edge portion. As will be apparent, the leading edge of the spar is made up of two thicknesses of compacted filaments, those of the spar itself being the inner thickness, and those of the overlying trailing edge portion filaments which were wrapped around the spar making up the outer thickness.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. A wind turbine blade tapering from base to tip including a filament wound spar having an airfoil-shaped portion at and near the tip and forming the finished shape of the blade, said portion tapering toward the tip and the remaining portion of the spar having a filament wound tapering trailing edge portion mounted thereon with the filaments on the trailing edge portion extending around the spar.

2. A blade as in claim 1 in which the number of filament layers increases from tip to base for increasing the blade strength toward the base.

3. A blade as in claim 1 in which the filaments forming the windings are larger at the base than at the top.

4. A blade as in claim 1 in which the portion of the spar are shaped in cross section to produce the desired airfoil cross section with the trailing edge portion thereon.

5. A wind turbine blade tapering from base to tip, said blade including:
   a filament wound spar forming the basic blade structure, an outer portion of the spar at and near the tip being airfoil shape and forming the finished shape and surface of the blade in this portion, and
   a trailing edge portion in the form of a hollow shell tapering from base toward the tip and positioned on the remainder of the spar, this trailing edge being filament wound with the filaments of the trailing edge also extending around and enclosing the spar except for said outer portion.

6. A blade as in claim 5 in which the wall thickness of the filament wound trailing edge decreases from the base toward the tip.

7. A blade as in claim 5 in which the wound filaments decrease in size from the base of the blade toward the tip to produce a shell thickness of the filaments that decreases from the base toward the tip of the blade.

8. In the manufacture of a filament wound wind turbine blade the steps of:
   winding filaments on a mandrel to form a spar, the mandrel being substantially uniform cross section for a major portion of its length, the remainder tapering to form the blade tip,
   positioning a tapering trailing edge mandrel on the side of the formed spar, and winding the combined spar and trailing edge with filaments to form the finished blade.

9. The process of claim 8 including the additional shape of deforming the spar to produce, with the trailing edge mandrel, the desired airfoil sections for the finished blade.

10. The process of claim 8 in which the windings used in winding the combined spar and trailing edge mandrel taper from base to tip of the finished blade.

* * * * *